United States Patent
Kapitán et al.

(10) Patent No.: US 10,190,912 B2
(45) Date of Patent: Jan. 29, 2019

(54) OPTICAL SYSTEM OF A HIGH-RESOLUTION IMAGING SPECTROGRAPH FOR DEEP UV RAMAN SPECTROSCOPY

(71) Applicants: Meopta—optika, s.r.o., Přerov (CZ); Univerzita Palackého v Olomouc, Olomouc (CZ)

(72) Inventors: Josef Kapitán, Šternberk (CZ); Daniel Vacula, Břest (CZ); Zdeněk Lošťák, Olomouc (CZ); Vlastislav Svoboda, Přerov (CZ)

(73) Assignees: MEOPATA—OPTIKA, S.R.O., Prerov (CZ); UNIVERZITA PALACKÉHO V OLOMOUC, Olomouc (CZ)

( * ) Notice: Subject to any disclaimer, the term of this patent is extended or adjusted under 35 U.S.C. 154(b) by 0 days.

(21) Appl. No.: 14/962,100

(22) Filed: Dec. 8, 2015

(65) Prior Publication Data

US 2016/0169741 A1    Jun. 16, 2016

(30) Foreign Application Priority Data

Dec. 10, 2014 (CS) .................... 2014-882

(51) Int. Cl.
  *G01J 3/44* (2006.01)
  *G01J 3/28* (2006.01)
  *G01J 3/36* (2006.01)
  *G01J 3/02* (2006.01)

(52) U.S. Cl.
  CPC .............. *G01J 3/44* (2013.01); *G01J 3/0208* (2013.01); *G01J 3/2823* (2013.01); *G01J 3/36* (2013.01)

(58) Field of Classification Search
  CPC ........... G01J 3/44; G01J 3/0208; G01J 3/2823
  See application file for complete search history.

(56) References Cited

U.S. PATENT DOCUMENTS 5,717,518 A * 2/1998 Shafer .................. G02B 13/143
                                                                 359/355
6,163,411 A * 12/2000 Tsuchida .............. G02B 15/161
                                                                 359/654

(Continued)

FOREIGN PATENT DOCUMENTS

CN         102156100 A      8/2011
FR          2970075 A1      7/2012

(Continued)

OTHER PUBLICATIONS

CZ Search Report; PV2014-882, 3 pgs.

*Primary Examiner* — Michael C Bryant
(74) *Attorney, Agent, or Firm* — Schmeiser, Olsen & Watts, LLP

(57) ABSTRACT

An optical system of a high-resolution imaging spectrograph intended for deep ultraviolet Raman spectroscopy, including an entrance aperture constituted by a slit, followed by a collimating objective, with a dispersive element located between the collimating objective and the subsequent focusing objective is provided. A multichannel radiation detector is arranged behind the focusing objective. The collimating objective is formed at least by a main mirror, wherein the focussing objective is formed by a set of lenses. The dispersion element is formed at least by one diffraction grating 4 and/or an optical prism.

15 Claims, 4 Drawing Sheets

(56) References Cited

U.S. PATENT DOCUMENTS

Figure 1:
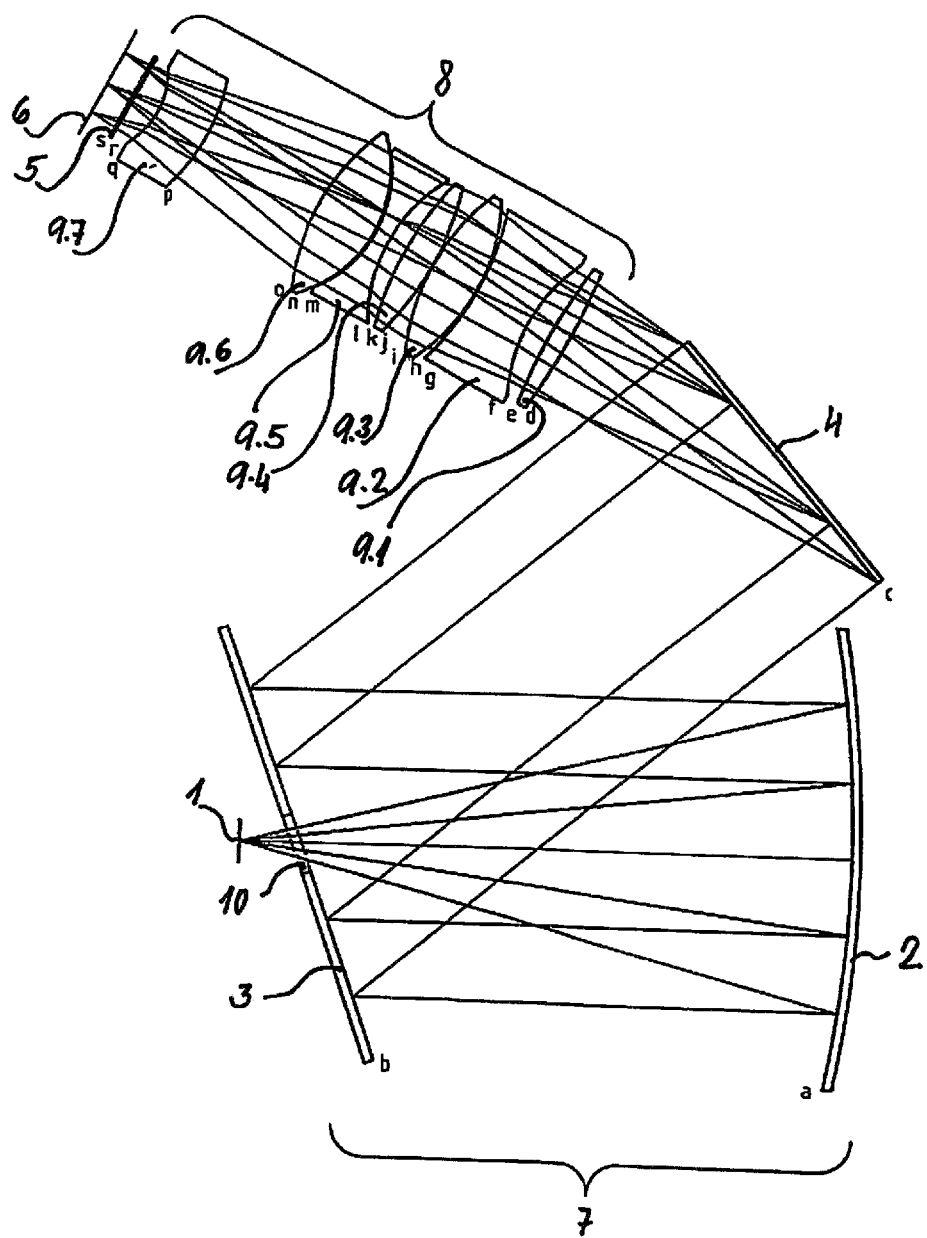

| | | | | |
|---|---|---|---|---|
| 8,125,634 | B1* | 2/2012 | Nikitin | G01J 1/429 |
| | | | | 250/458.1 |
| 2002/0176077 | A1* | 11/2002 | Caruso | G01J 3/02 |
| | | | | 356/328 |
| 2009/0091753 | A1* | 4/2009 | Beardsley | G01J 3/0262 |
| | | | | 356/305 |
| 2011/0242528 | A1* | 10/2011 | Hwang | G01N 21/9501 |
| | | | | 356/237.2 |
| 2012/0105845 | A1* | 5/2012 | Herrala | G01J 3/0208 |
| | | | | 356/326 |
| 2013/0063722 | A1* | 3/2013 | Sparks | G01J 3/447 |
| | | | | 356/327 |
| 2013/0182250 | A1 | 7/2013 | McClure | |
| 2015/0298082 | A1* | 10/2015 | Machuca | B01F 15/0022 |
| | | | | 366/152.3 |
| 2015/0341578 | A1* | 11/2015 | Lewkow | H04N 5/374 |
| | | | | 348/308 |

FOREIGN PATENT DOCUMENTS

| | | | |
|---|---|---|---|
| GB | 2362460 | A | 11/2001 |
| JP | 2000304613 | A | 11/2000 |
| JP | 2000304614 | A | 11/2000 |

\* cited by examiner

OPTICAL SYSTEM OF A HIGH-RESOLUTION IMAGING SPECTROGRAPH FOR DEEP UV RAMAN SPECTROSCOPY

CROSS-REFERENCE TO RELATED APPLICATIONS

This application claims priority to Czech Application No. PV 2014-882, having a filing date of Dec. 10, 2014, the entire contents of which are hereby incorporated by reference.

FIELD OF TECHNOLOGY

The following relates to an arrangement of an optical system of a high lens speed, high-resolution imaging spectrograph to detect the electromagnetic spectrum that is primarily intended for ultraviolet Raman spectroscopy, in particular for identification of substances in determining their composition and structure, and for analysis of surfaces and biological systems.

BACKGROUND

At present, spectrographs containing basic optical elements are mainly used to detect the incident electromagnetic radiation differentiated according to wavelengths, such basic optical elements being: an aperture for the entering polychromatic, usually divergent radiation beam, e.g. a slit. Furthermore, a collimating element which converts the divergent optical beam coming from the entrance aperture into a collimated beam—which is parallel. Further, a dispersive element, generally an element causing refractive dispersion (light refraction) or diffractive dispersion (light diffraction) of a polychromatic beam into monochromatic beams according to wavelengths. Further, it comprises a focusing element, which generates an image of the entrance aperture—usually a slit, at the site of a certain focal plane of the exit aperture, usually on the flat multi-channel radiation detector, in order to record simultaneously the radiation of a large number of wavelengths. The dispersive element in multi-channel detectors is usually a diffraction grating or a dispersive prism.

Notes on Raman spectroscopy: Raman spectroscopy is used to study the structure of Raman scattering molecules. Raman scattering is an inelastic scattering of the optical radiation on the molecules of the test substance, at which the frequency of the scattered radiation is shifted towards the frequency of the incident radiation by a value that corresponds to the rotational or vibrational transition in the molecule. A molecule can exist in states with energy that acquires only certain allowed values or energy levels. Vibrational or rotational transition is a change in the molecular state characterized by an abrupt change in the vibrational and rotational energy levels of the molecule. Vibrational energy level is a possible value of energy that is acquired by a molecule in the vibrational motion of its atoms around their equilibrium position. Rotational energy level is a value of energy that can be acquired by a molecule during its rotational movement around the axis passing through its center of gravity. These energy levels are dependent on the particular atomic structure and their spatial arrangement, i.e. on the type of the test substance.

Raman spectroscopy is used to measure inelastically scattered light (Raman scattering) on the molecules of the test substance. Scattered radiation has a different wavelength than the incident radiation, due to interactions of the radiation with vibrational and in some cases rotational states of molecules. The scattered radiation carries a large amount of information about the nature and structure of the test substance. Resonance enhancement of Raman scattering of biologically relevant substances (proteins, nucleic acids, and others) can be achieved in the ultraviolet region of the spectrum, at about 205 to 270 nm, to obtain additional unique information on these substances.

Raman scattering is a relatively weak phenomenon. The spectrograph for Raman spectroscopy is subject to high demands in terms of lens speed, i.e. the amount of radiation transferred to the detector. Further efforts are needed to achieve high resolution (0.03 to 0.06 nm) and spectral range of tens of nanometers.

The currently used and commercially available spectrographs (supplied by Horiba Jobin Yvon, Princeton Instruments, Andor) useful for Raman scattering in the UV region, are generally composed of two mirrors and a reflective diffraction grating. Alternatively, the optical assembly is complemented by an additional correction mirror, as described for example in the U.S. Patent Publication 2013/0182250 A1. The patent covers the design of mirror imaging spectrographs, in which the assembly of the collimating mirror, diffraction grating and focusing mirror is supplemented by at least one corrective aspheric mirror, which is intended to correct extra-axial imaging defects (aberrations), in particular astigmatism and coma. The advantage of the mirror systems is their achromaticity (absence of color defects) and a relatively high reflectivity. The disadvantages are the limited possibility of correction of other optical defects, in particular astigmatism and coma. Moreover, these spectrographs achieve maximum lens speed of only about f/4.

Better correction of optical defects, and thereby a higher lens speed, can be achieved using lens objectives. In the visible spectral range, these systems with the lens speed of up to f/1.8 and using transmission gratings (supplied by Kaiser, model Holospec f/1.8) are very well available. However, the situation in the ultraviolet spectral region is completely different, mainly due to the limited number of transparent optical materials. There is high demand on the design of lenses, thus increasing the complexity of the system and its cost. The scientific literature describes only one spectrograph operating in the UV spectral region and containing lens objectives as collimating and focusing elements, which achieves the nominal lens speed of f/2. This system, however, achieves spectral resolution of only 12-14 $cm^{-1}$ and its throughput is limited by surface losses and vignetting (blocking of the outer parts of the beam) due to a large distance between the collimating and focusing objectives.

SUMMARY

An aspect relates to a spectrograph that achieves a higher lens speed (f/2) than the mirror systems, while maintaining high spectral resolution necessary for Raman spectroscopy, and achieving a higher throughput than that of the full lens system. The spectrograph should be applicable for multi-channel detectors equipped with a cooled detector chip and a cover glass. It requires the use of a circular pupil of the focusing aspect for the diffracted radiation beam. The system must allow tuning, i.e., a change in the wavelength range by simply rotating the diffraction grating, and a small change in the position and orientation of the detector—focusing into the focusing plane.

The said goal is largely met by the high resolution imaging spectrograph, intended for deep ultraviolet Raman spectroscopy, the optical system of which comprises an entrance aperture formed by a slit, which is followed by a collimating objective, with a dispersive element placed between the collimating objective and the focusing objective, and a multi-channel radiation detector behind the focusing objective. Embodiments of the invention are characterized in that the collimating aspect is formed by at least a main mirror, while the said focusing aspect is formed by a set of lenses. At the same time, the dispersive element is formed by at least one diffraction grating and/or an optical prism.

The optical system of the imaging spectrograph may have a collimating aspect comprising an aspherical mirror and a corrective mirror with an aperture.

In a preferable embodiment, the focusing aspect consists of seven lenses, of which at least one has an aspherical surface.

The higher performance of the spectrograph with an optical system as per embodiments of the invention is that it achieves a higher lens speed (f/2) than the mirror systems, while maintaining high spectral resolution required for Raman spectroscopy. It also achieves a higher throughput than that of the full lens system. The spectrograph can be used with multi-channel detectors equipped with a cooled detector chip and a glass cover. It is advantageous to use the circular pupil of the focusing aspect for the diffracted radiation beam. Embodiments of the invention must allow tuning, e.g., a change in the wavelength range by simply rotating the diffraction grating, and a small change in the position and orientation of the detector—focusing into the focusing plane.

BRIEF DESCRIPTION

Some of the embodiments will be described in detail, with reference to the following figures, wherein like designations denote like members, wherein:

FIG. 1 is an embodiment of the collimating objective formed by a pair of mirrors with a diffraction grating and a seven-lens focusing objective.

Figure 2:
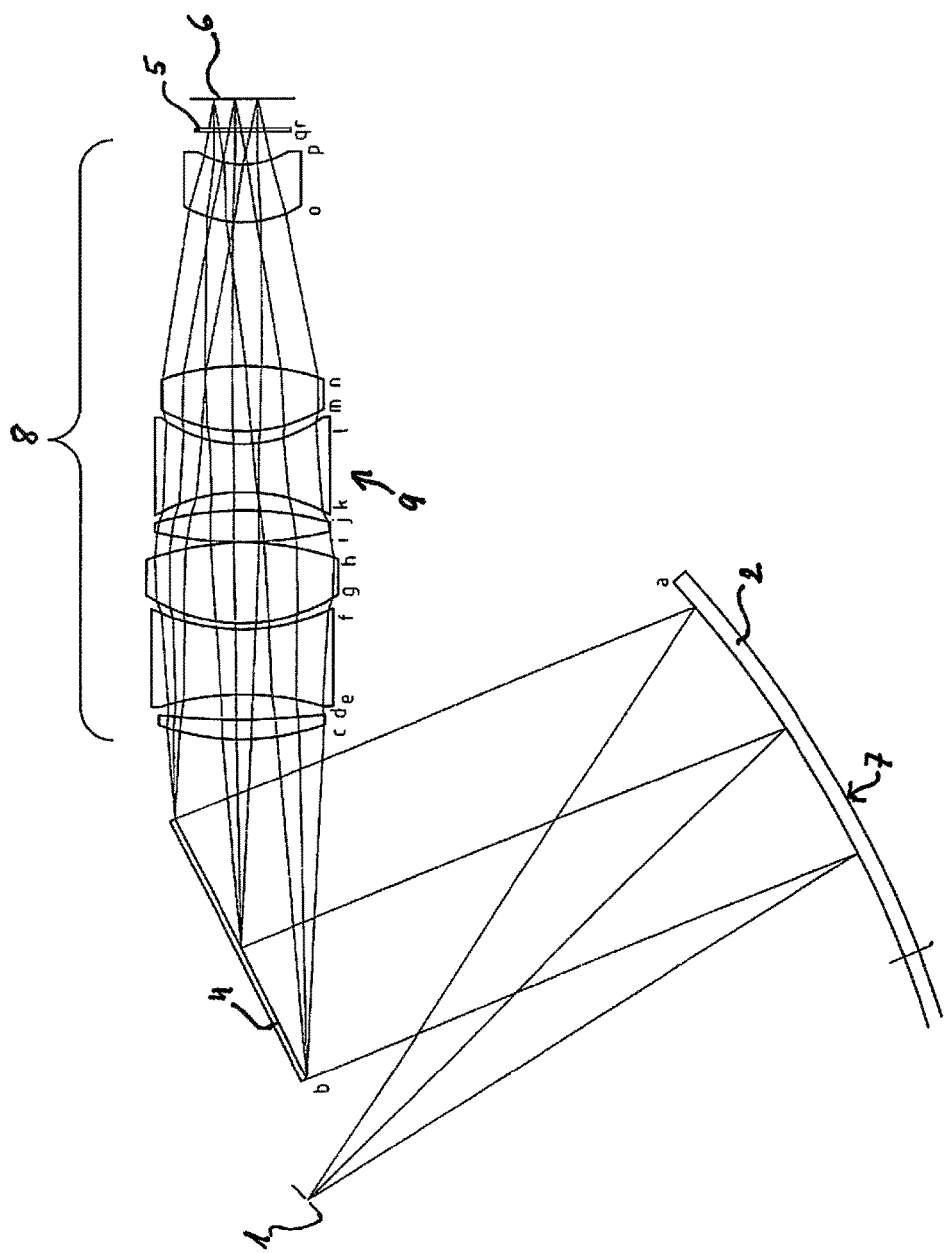
Figure 3:
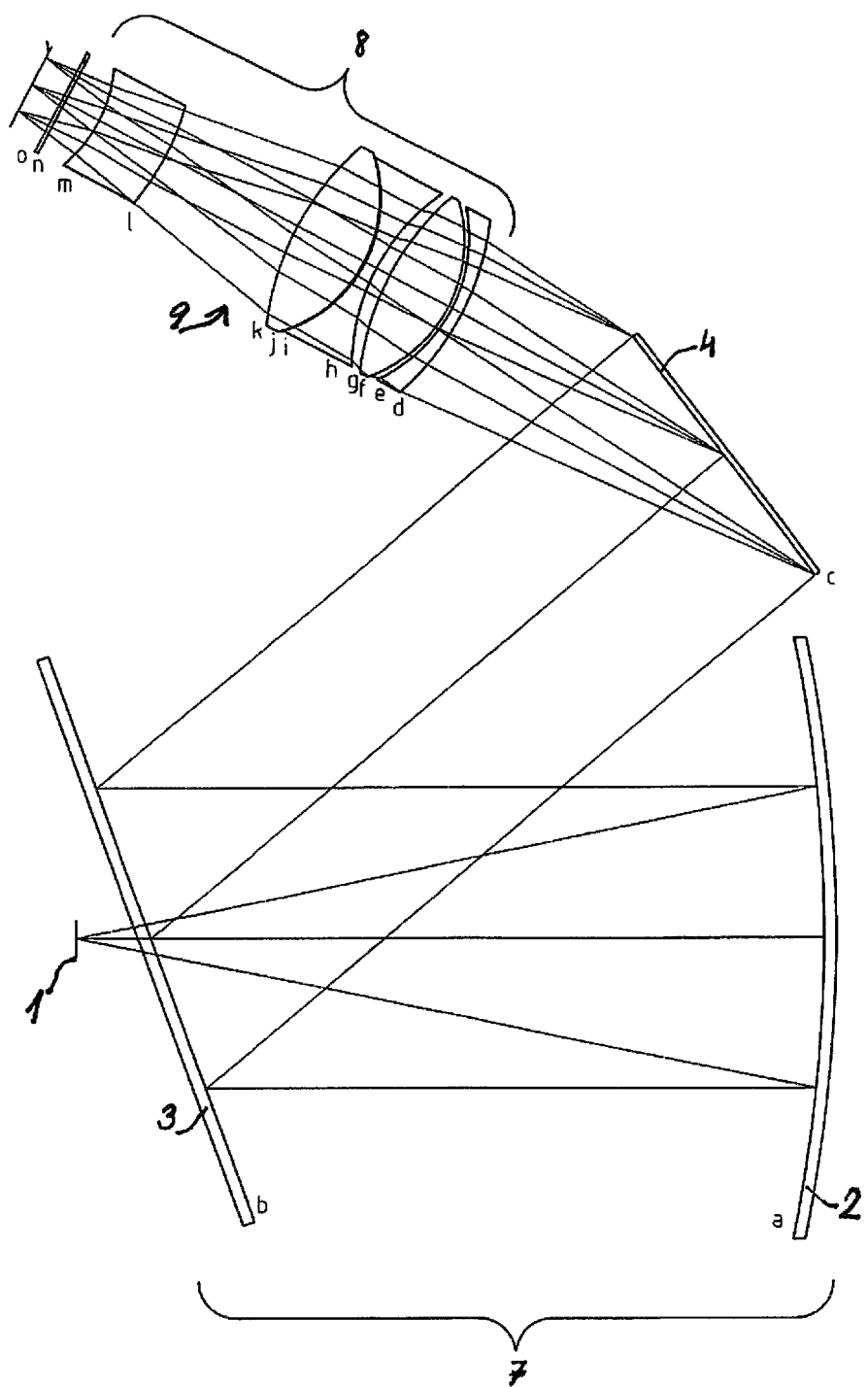
Figure 4:
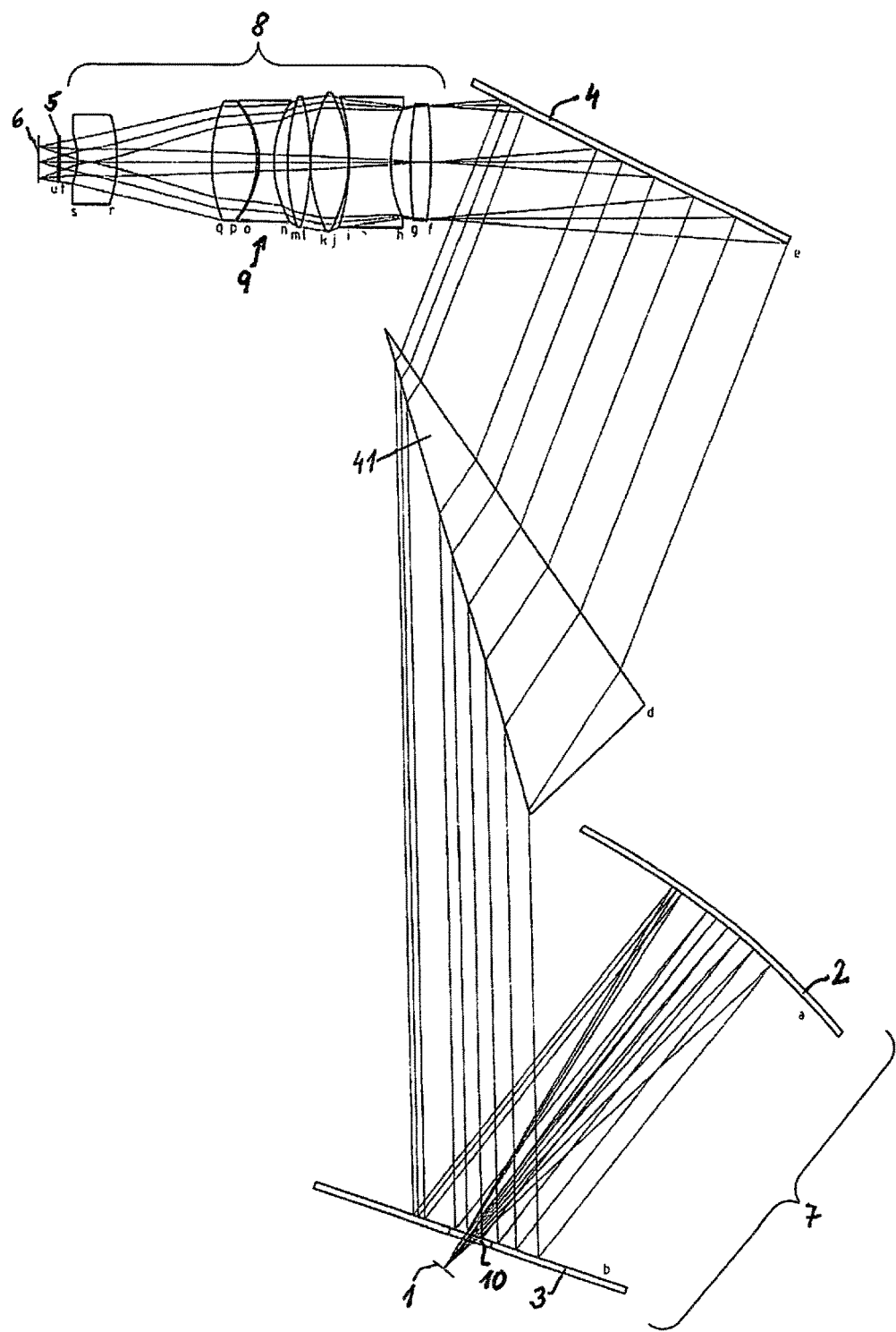

FIG. 2 is a simplified embodiment of the diffraction grating as a dispersive element, wherein the focusing objective is formed by one mirror, FIG. 3 shows an example of embodiment with a pair of mirrors in the collimating objective and an assembly of five lenses in the focusing objective, FIG. 4 shows an example of embodiment wherein the dispersion of polychromatic beam is achieved by a dispersive system consisting of a combination of grating and prism.

DETAILED DESCRIPTION

Example 1

Collimating objective 7 of the spectrograph, the optical system of which is shown in FIG. 1, consists of two aspherical mirrors 2, 3, designated as main 2 and corrective 3. The aspherical corrective mirror 3 has an aperture 10 in its center, with size allowing passage of the polychromatic divergent light beam 11 originating from slit 1 without being vignetted at the edges. The focusing objective 8 consists of the assembly 9 of seven lenses 9.1, 9.2, 9.3, 9.4, 9.5, 9.6, 9.7, one of them having an aspherical surface. A combination of fused silica and $CaF_2$ has been selected as the material of the individual optical elements of the focusing objective 8. Diffraction grating 4 with a frequency of 3600 lines/mm is placed between the collimating objective 7 and the focusing objective 8. The diffraction grating 4 uses the first diffraction order, with >40% efficiency. Before hitting the detector 6, the light beam 11 passes through the cover glass 5, which is a part of detector 6. Parameters of the respective optical surfaces are shown below in Table 1.

Aspherical surface is defined by the relation $$z = \frac{cr^2}{1+\sqrt{1-(1+K)c^2 r^2}} + \sum_i A_i r_i$$

where c is the surface curvature (the reciprocal value of the radius), K is the conic constant, r is the radial coordinate and Ai are aspherical coefficients.

Parameters of the respective optical media a through q of the optical system according to FIG. 1 are shown in Table 1, where the dimensions are given in mm.

TABLE 1

Parameters of the spectrograph as per FIG. 1
Example 1 of the invention application
(dimensions in mm)

| area | radius | thickness | material | comments |
|---|---|---|---|---|
| 1 | plane | 200 | air | Slit 1 |
| a | 401.789 | −180 | mirror | Main aspherical mirror 2<br>K = 0.107497, A4 = −1.572858E−9,<br>A6 = −1.006896E−13, A$_8$ = 1.991723E−17,<br>A10 = −1.855797E−21 |
| b | 93476.4 | 200 | mirror | Correction aspherical mirror 3<br>K = −4995714, A4 = −2.348767E−9,<br>A6 = −2.497952E−13, A$_8$ = 4.020043E−17,<br>A10 = −3.148018E−21 rotated by 20°; |
| c | plane | 80 | mirror | diffraction grating 4 with frequency of 3600 lines/mm; rotated by −0.7° (for the wavelength range from 250 to 272 nm)<br>the angle between the optical axes of lenses 7, 8 = 68° |
| d | 224.497 | −6.293 | fused silica | lens 9.1 |
| e | 182.502 | −8.242 | air | |
| f | 57.558 | −20.004 | fused silica | lens 9.2 |

TABLE 1-continued

Parameters of the spectrograph as per FIG. 1
Example 1 of the invention application
(dimensions in mm)

| area | radius | thickness | material | comments |
|---|---|---|---|---|
| g | −93.609 | −0.296 | air | |
| h | −63.458 | −16.898 | $CaF_2$ | lens 9.3 |
| i | 68.974 | −0.175 | air | |
| j | 107.435 | −10.172 | $CaF_2$ | lens 9.4 |
| k | 97.214 | −6.266 | air | |
| l | 51.565 | −4.987 | fused silica | lens 9.5 |
| m | −41.336 | −0.619 | air | |
| n | −42.117 | −20.034 | $CaF_2$ | lens 9.6 |
| o | 72.268 | −42.402 | air | |
| p | −52.762 | −18.005 | fused silica | Lens 9.7  K = −15.14056, A4 = −9.654539E−6, A6 = 2.199664E−8, A8 = −1.537923E−11 |
| q | −28.218 | −8.772 | air | |
| r | plane | −1 | fused silica | cover glass 5 |
| s | plane | −9 | air | |
| image | plane | | | detector 6 |

*Where K denotes conicity and $A_i$ other aspheric coefficients

Example 2

The collimating objective 7 of the spectrograph, the optical system of which is shown in FIG. 2, unlike the previous embodiment example, consists of the off-axis, biconic, aspherical mirror 2. The focusing objective 8 consists of seven lenses 9.1, 9.2, 9.3, 9.4, 9.5, 9.6, and 9.7. A combination of fused silica and $CaF_2$ has been selected as the material of the individual optical elements of the focusing objective 8. Diffraction grating 4 with a frequency of 3600 lines/mm is placed between the collimating objective 7 and the focusing objective 8. The diffraction grating 4 uses the first diffraction order, with >40% efficiency. The polychromatic divergent light beam coming out of the slit 1 falls on the collimating objective 7 consisting of one main mirror 2, and is reflected to the diffraction grating 4. Diffraction of the light beam occurs on the diffraction grating 4, dispersing the polychromatic beam due to the effects of light diffraction on the grating 4. Before hitting the detector 5, the light beam may or may not pass through the cover glass 4, which is a part of detector 6. Parameters of the respective optical surfaces in this particular embodiment are specified below in Table 2.

TABLE 2

Parameters of the spectrograph as per FIG. 2
Example 2 of the invention application
(dimensions in mm)

| area | radius | thickness | material | comments |
|---|---|---|---|---|
| object | plane | 200 | air | Slit 1 |
| a | * | −190 | Mirror | Mirror 2 biconic surface  * . . . radius r1 = −400.023; K1 = −0.999427 radius $r_2$ (perpendicular to r1) = −400.370; $K_2$ = −0.998466 |
| b | plane | 80 | mirror | diffraction grating 4 with a frequency of 3600 lines/mm  rotated by −6.88° (for the wavelength range from 205 to 220 nm)  the angle between the beam incident on the diffraction grating 4 and the optical axis of the focusing objective 8 is 68 degrees |
| c | 77.288 | 5.977 | fused silica | lens 9.1 |
| d | 233.929 | 7.676 | air | |
| e | −84.931 | 20.012 | fused silica | lens 9.2 |
| f | 64.985 | 1.869 | air | |
| g | 54.381 | 25.005 | $CaF_2$ | lens 9.3 |
| h | −85.406 | 0.181 | air | |
| i | 115.500 | 10.081 | $CaF_2$ | lens 9.4 |
| j | −93.643 | 5.606 | air | |
| k | −54.296 | 15.016 | fused silica | lens 9.5 |
| l | 42.624 | 3.859 | air | |
| m | 49.866 | 20.015 | $CaF_2$ | lens 9.6 |
| n | −76.024 | 45.024 | air | |
| o | 34.906 | 18.024 | fused silica | lens 9.7 |
| p | 26.760 | 10.022 | air | |

TABLE 2-continued

Parameters of the spectrograph as per FIG. 2
Example 2 of the invention application
(dimensions in mm)

| area | radius | thickness | material | comments |
|---|---|---|---|---|
| q | plane | 1 | fused silica | cover glass 5 |
| r | plane | 9 | air | |
| image | plane | | | detector 6 |

* Where $K_i$ denotes conicity

The beam incident on the focusing objective 8 has a circular cross section, while the beam coming out of the collimating objective 7 and incident on the diffraction grating 4 has an elliptical cross section.

Example 3

The embodiment example 3 differs from example 1 in that the focusing objective 8 is composed of five lenses 9.1, 9.2, 9.3, 9.4, and 9.5.

Collimating objective 7 of the spectrograph, the optical system of which is shown in FIG. 3, consists of two aspherical mirrors 2, 3, which are designated as main mirror of fused silica and $CaF_2$ has been selected as the material of the individual optical elements of the focusing objective 8. Diffraction grating 4 with a frequency of 3600 lines/mm is placed between the collimating objective 7 and the focusing objective 8. The grating 4 uses the first diffraction order, with >40% efficiency. Before hitting detector 6, the light beam may pass through the cover glass 5, which is a part of detector 6. Parameters of the respective optical surfaces are shown below in Table 3. Aspherical surface is defined by the relation (A). Parameters of the respective optical media a through o of the optical system according to FIG. 2 are shown in Table 2, where the dimensions are given in mm.

TABLE 3

Parameters of example 3 of the spectrograph embodiment:
Example 3 of the invention application
(dimensions in mm)

| area | radius | thickness | material | comments |
|---|---|---|---|---|
| object | plane | 200 | air | Slit 4 |
| a | −401.79 | −180 | mirror | Main mirror 2, * K = 0.107491, $A_4$ = −1.572926E−9, $A_6$ = −1.006967E−13, $A_8$ = 1.991713E−17, $A_{10}$ = −1.844422E−21 |
| b | 93664.6 | 200 | mirror | Correction mirror 3, rotated by 20 degrees; K = −4995723, $A_4$ = −2.342046E−9, $A_6$ = −2.501973E−13 $A_8$ = 4.018759E−17 $A_{10}$ = −3.162602E−21 |
| c | plane | −80 | mirror | diffraction grating 4 with the frequency of 3600 lines/mm; rotated by −2.7° (for the wavelength range from 218 to 234 nm) the angle between the beam incident on the diffraction grating 4 and the optical axis of the focusing objective 8 is 68 degrees |
| d | −72.079 | −3.000 | fused silica | lens 9.1 |
| e | −41.655 | −1.000 | air | |
| f | −36.205 | −18.125 | fused silica | lens 9.2 K = −0.011368, $A_4$ = 3.305605E−7, $A_6$ = 2.311898E−9, $A_8$ = −7.310637E−13 |
| g | 70.164 | −4.099 | air | |
| h | 54.186 | −3.275 | $CaF_2$ | lens 9.3 |
| i | −37.146 | −0.498 | air | |
| j | −37.695 | −20.002 | $CaF_2$ | lens 9.4 |
| k | 75.983 | −39.398 | air | K = −0.619901, $A_4$ = 7.664860E−7, $A_6$ = 2.173671E−9, $A_8$ = −3.028988E−12 |
| l | −59.329 | −20.000 | fused silica | lens 9.5 K = −2.313735, $A_4$ = 4.698205E−7, $A_6$ = 1.901152E−8, $A_8$ = −2.225080E−11 |
| m | −36.803 | −10.314 | air | |
| n | plane | −1 | fused silica | cover glass 5 |
| o | plane | −9 | air | |
| image | plane | | | detector 6 |

* Where K denotes conicity and $A_i$ other aspheric coefficients

3 and corrective mirror 2. The aspherical corrective mirror 3 has an aperture 10 in its center, with size allowing passage of the polychromatic divergent light beam coming out of the slit 1, without being vignetted at the edges. The focusing objective 8 is composed of five lenses 9.1, 9.2, 9.3, 9.4, and 9.5, three of them having aspherical surfaces. A combination Example 4

Embodiment example 4, according to FIG. 4, is different compared to the embodiment 1 in that it comprises in addition a dispersive prism 41 in the optical assembly. The optical prism 41 has two functions: it increases the spectral resolution by increasing the total dispersion of the system, and it compensates for beam expansion (anamorphic reduction) on the diffraction grating 4, so that the collimated beam incident on and coming out of the system of dispersive elements 41, 4 has about a circular cross section.

Collimating objective 7 of the spectrograph, the optical system of which is shown in FIG. 4, consists of two aspherical mirrors 2, 3, which are designated as main mirror 3 and corrective mirror 2. The aspherical corrective mirror Aspherical surface is defined by the relation $$z = \frac{cr^2}{1+\sqrt{1-(1+K)c^2r^2}} + \sum_i A_i r_i$$

Parameters of the respective optical media a through u of the optical system according to FIG. 4 are shown in Table 4, where the dimensions are given in mm.

TABLE 4

Parameters of example 4 of the spectrograph embodiment:
Example 4 of the invention application
(dimensions in mm)

| area | radius | thickness | material | comments |
|---|---|---|---|---|
| object | plane | 200 | air | Slit 4 |
| a | −401.79 | −180 | mirror | Main mirror 2, K = 0.107491, $A_4$ = − 1.572926E−9, $A_6$ = −1.006967E−13, $A_8$ = 1.991713E−17, $A_{10}$ = −1.844422E−21 |
| b | 93664.6 | 300 | mirror | Correction mirror 3, rotated by 20 degrees; K = −4995723, $A_4$ = −2.342046E−9, $A_6$ = −2.501973E−13 $A_8$ = 4.018759E−17 $A_{10}$ = −3.162602E−21 |
| c | plane | 35 * | fused silica | Prism 41, - Angle of rotation 56.38°. Apex angle of 18°. |
| d | plane | 169.26 | air | |
| e | plane | −90 | mirror | diffraction grating 4 with the frequency of 3600 lines/mm; rotated by −3.5° (for the wavelength range from 218 to 234 nm) the angle between the beam incident on the diffraction grating 4 and the optical axis of the focusing objective 8 is 68 degrees |
| f | — 224.724 | −9.511 | fused silica | Lens 9.1 |
| g | 182.405 | −9.187 | air | |
| h | 57.466 | −18.616 | fused silica | lens 9.2 |
| i | −94.675 | −0.515 | air | |
| j | −63.907 | −16.996 | $CaF_2$ | lens 9.3 |
| k | 68.392 | −0.158 | air | |
| l | 108.433 | −10.276 | $CaF_2$ | lens 9.4 |
| m | 95.827 | −6.298 | air | |
| n | 51.242 | −6.647 | fused silica | lens 9.5 |
| o | −41.349 | −0.977 | air | |
| p | −42.500 | −20.147 | $CaF_2$ | lens 9.6 |
| q | 71.780 | −42.226 | air | |
| r | −56.418 | −17.998 | fused silica | lens 9.7 K = −15.31897, $A_4$ = −7.803339E−6, $A_6$ = 1.732514E−8, $A_8$ = −1.043447E−11 |
| s | −31.282 | −8.077 | air | |
| t | plane | −1 | fused silica | cover glass 5 |
| u | plane | −9 | air | |
| image | plane | | | detector 6 |

* Where K denotes conicity and $A_i$ other aspheric coefficients

3 has an aperture 10 in its center, with size allowing passage of the polychromatic divergent light beam coming out of the slit 1, without being vignetted at the edges. The focusing objective 8 consists of the set of seven lenses 9.1, 9.2, 9.3, 9.4, 9.5, 9.6, and 9.7, one of them having an aspherical surface. A combination of fused silica and $CaF_2$ has been selected as the material of the individual optical elements of the focusing objective 8. A combination of prism 41 and diffraction grating 4 with a frequency of 3600 lines/mm is placed as a dispersive element between the collimating objective and the focusing objective. The grating 4 uses the first diffraction order, with >40% efficiency. Before hitting detector 7, the light beam may pass through the cover glass 5, which is a part of detector 6. Parameters of the respective optical surfaces are shown below in Table 4.

Other parameters common to all embodiment examples:

Lens speed of the spectrograph: at least f/2

The focal length of the focusing objective 8: 100 mm

Resolution of lenses 7, 8: 40 lines per mm

The absolute value of magnification of the optical system: 0.5×

The spectrograph is intended for multichannel cooled detectors 6 with the following parameters:

the size of the visible field at least 15×6 mm pixel size: 13×13 μm to 26×26 μm cover glass 5 of fused silica with thickness 0-1.5 mm The spectral resolution of the spectrograph is dependent on the selected spectral range (excitation wavelength), and is shown in Table 5 for the aforementioned embodiment example 1:

TABLE 5

Spectral resolution for the various spectrograph configurations

| Config. | Wavelength excitation length (nm) | Angle rotation of grating 4 (deg) | Spectral resolution ($cm^{-1}$) | | |
|---|---|---|---|---|---|
| | | | 500 $cm^{-1}$ | 1800 $cm^{-1}$ | 3200 $cm^{-1}$ |
| 1 | 250 | −0.7 | 8.9 | 7.1 | 4.4 |
| 2 | 240 | 1.0 | 9.9 | 8.2 | 5.7 |
| 3 | 230 | 2.7 | 11.3 | 9.4 | 7.0 |
| 4 | 218 | 4.4 | 13.0 | 11.0 | 9.0 |
| 5 | 205 | 6.5 | 14.9 | 13.3 | 11.3 |

Embodiments of the invention need not be limited to these examples. In practice, values of the individual parameters of the focusing objective 8 may range in the following intervals:

TABLE 6

Possible range of parameters for the focusing objective 8
Range of parameters for the focusing objective 8
(dimensions in mm)

| radius | thickness | material | comments |
|---|---|---|---|
| −210 ÷ −230 (convex) | −5 ÷ −10 | fused silica | lens 9.1 |
| 180 ÷ 190 (convex) | −7 ÷ −10 | air | |
| 55 ÷ 58 (concave) | −7 ÷ −20 | fused silica | lens 9.2 |
| −90 ÷ −100 (concave) | −0.25 ÷ −0.5 | air | |
| −60 ÷ −65 (convex) | −15 ÷ −20 | CaF2 | lens 9.3 |
| 65 ÷ 75 (convex) | −0.15 ÷ 0.2 | air | |
| −100 ÷ −110 (convex) | −10 ÷ −12 | CaF2 | lens 9.4 |
| 80 ÷ 100 (convex) | −4 ÷ −7 | air | |
| 50 ÷ 55 (concave) | −5 ÷ −15 | fused silica | lens 9.5 |
| −35 ÷ −45 (concave) | −0.5 ÷ −2 | air | |
| −40 ÷ −45 (convex) | −20 ÷ −25 | CaF2 | lens 9.6 |
| 70 ÷ 75 (convex) | −35 ÷ −45 | air | |
| 50 ÷ 65 (convex) | −17 ÷ −19 | fused silica | lens 9.7<br>$K = -15 \div -20$<br>$A_4 = -6 \div -10E{-}6$<br>$A_6 = 1.5 \div 2.5E{-}8$<br>$A_8 = -1 \div -1.6E{-}11$ |
| −25 ÷ −35 (concave) | −7 ÷ −10 | air | |

Where K denotes conicity and $A_i$ other aspheric coefficients

The function of the optical system according to embodiments of the invention, i.e. the spectrograph function according to examples 1 and 3 is as follows:

The polychromatic divergent light beam enters into the spectrograph system through the slit 1, passes through the aperture 10 in the aspherical correction mirror 3 and falls on the main correction mirror 2, from which it is reflected. Given the shape of the main correction mirror 2 and the fact that the slit 1 is close to its focal point, the divergent beam becomes almost collimated after the reflection. The beam continues to the aspherical correction mirror 3, from which it is also reflected, and due to the influence of the aspherical surface, the beam becomes even more collimated. The collimated beam then falls on the reflective diffraction grating 4. Upon incidence on the grating 4, the light beam is diffracted and the polychromatic beam is diffracted on the grating 4 to the respective monochromatic beams which are then further spread under different angles corresponding to their wavelengths. These beams pass through the seven-lens focusing objective 8, which is intended to focus the beams onto the detector 6. Before hitting detector 6, the beams pass through the glass cover 5, which serves as a protection of detector 6.

INDUSTRIAL APPLICABILITY

The embodiments of the invention can be applied in high-resolution imaging spectrographs for deep UV Raman spectroscopy. Spectrographs with the applied invention can be produced in an industrial scale.

The invention claimed is:
1. A device comprising:
an elongated entrance aperture comprised of a slit, which is followed by a collimating objective, with a dispersive element inserted between the collimating objective and a following focusing objective, and
a multi-channel radiation detector arranged behind the focusing objective, wherein the collimating objective comprises at least a main aspherical mirror, wherein the focusing objective is formed by a set of lenses made of CaF2 and fused silica, and the dispersive element is formed by at least one of a diffraction grating and at least one optical prism that increases dispersion and corrects anamorphic magnification of the at least one diffraction grating;
wherein the device is capable of performing high resolution and high throughput Raman spectroscopy in the deep ultraviolet spectral region of 205 to 270 nm;
wherein the device is capable of lens speed of at least f/2;
further wherein the device is capable of achieving spectral resolution of less than 12 $cm^{-1}$.

2. The device of claim 1, wherein the collimating objective comprises an aspherical mirror and a second mirror with an opening.

3. The device of claim 1, wherein the focusing objective comprises seven lenses, of which at least one has an aspherical surface.

4. The device of claim 1, wherein the individual lenses of the focusing objective have the following parameters, respectively:

| Radius (mm) | Thickness (mm) | material | element |
|---|---|---|---|
| −210 ÷ −230 (convex) | −5 ÷ −10 | fused silica | lens 9.1 |
| 180 ÷ 190 (convex) | −7 ÷ −10 | air | |
| 55 ÷ 58 (concave) | −7 ÷ −20 | fused silica | lens 9.2 |
| −90 ÷ −100 (concave) | −0.25 ÷ −0.5 | air | |
| −60 ÷ −65 (convex) | −15 ÷ −20 | $CaF_2$ | lens 9.3 |
| 65 ÷ 75 (convex) | −0.15 ÷ 0.2 | air | |
| −100 ÷ −110 (convex) | −10 ÷ −12 | $CaF_2$ | lens 9.4 |
| 80 ÷ 100 (convex) | −4 ÷ −7 | air | |
| 50 ÷ 55 (concave) | −5 ÷ −15 | fused silica | lens 9.5 |
| −35 ÷ −45 (concave) | −0.5 ÷ −2 | air | |
| −40 ÷ −45 (convex) | −20 ÷ −25 | $CaF_2$ | lens 9.6 |
| 70 ÷ 75 (convex) | −35 ÷ −45 | air | |
| 50 ÷ 65 (convex) | −17 ÷ −19 | fused silica | lens 9.7<br>$K = -15 \div -20$<br>$A_4 = -6 \div -10E-6$<br>$A_6 = 1.5 \div 2.5E-8$<br>$A_8 = -1 \div -1.6E-11$ |
| −25 ÷ −35 (concave) | −7 ÷ −10 | air | |

Where K denotes conicity and $A_i$ other aspheric coefficients

5. The device claim 1, wherein the device achieves nominal lens speed of f/2 without a loss of throughput and without surface losses or vignetting.

6. The device of claim 1, further comprising a detector after the final lens of the focusing objective, wherein the final lens is made of fused silica and has a surface closest to the detector that is concave and the final lens has a surface farthest from the detector that is convex.

7. A high resolution and high throughput Raman spectroscopy system for Raman spectroscopy in the deep ultraviolet spectral range, comprising:
 a collimating assembly for collimating a polychromatic divergent light beam, the collimating assembly comprising:
  a first aspherical mirror, a second mirror, and an entrance aperture for the polychromatic divergent light beam, wherein the entrance aperture is a slit;
 a dispersing assembly, the dispersing assembly comprising:
  a prism and a diffraction grating, wherein the prism increases spectral resolution by increasing the total dispersion of the system and compensates for anamorphic beam expansion on the diffraction grating, further wherein the collimated beam has a substantially circular cross section upon leaving the dispersing assembly;
 a focusing assembly, the focusing assembly comprising multiple lenses made of at least one of CaF2 and fused silica, wherein at least one lens has an aspherical surface; and
 a multi-channel radiation detector following the focusing assembly, the multi-channel radiation detector including a cover glass;
 wherein the light beam travels from the collimating assembly to the dispersing assembly, from the dispersing assembly to the focusing assembly, and from the focusing assembly to the detector;
 wherein the spectroscopy system is capable of performing high resolution and high throughput Raman spectroscopy in the deep ultraviolet spectral region of 205 to 270 nm;
 wherein the spectroscopy system is capable of lens speed of at least f/2;
 further wherein the spectroscopy system is capable of achieving spectral resolution of less than 12 $cm^1$.

8. The high resolution and high throughput Raman spectroscopy system for Raman spectroscopy in the deep ultraviolet spectral range of claim 7, wherein the entrance aperture is located in the second mirror.

9. The high resolution and high throughput Raman spectroscopy system for Raman spectroscopy in the deep ultraviolet spectral range of claim 7, wherein the entrance aperture is located behind the second mirror.

10. The high resolution and high throughput Raman spectroscopy system for Raman spectroscopy in the deep ultraviolet spectral range of claim 7, wherein the focusing assembly includes seven lenses.

11. The high resolution and high throughput Raman spectroscopy system for Raman spectroscopy in the deep ultraviolet spectral range of claim 7, wherein the lenses of the focusing assembly have the following parameters:

| Radius (mm) | Thickness (mm) | material | element |
|---|---|---|---|
| −210 ÷ −230 (convex) | −5 ÷ −10 | fused silica | lens 9.1 |
| 180 ÷ 190 (convex) | −7 ÷ −10 | air | |
| 55 ÷ 58 (concave) | −7 ÷ −20 | fused silica | lens 9.2 |
| −90 ÷ −100 (concave) | −0.25 ÷ −0.5 | air | |
| −60 ÷ −65 (convex) | −15 ÷ −20 | $CaF_2$ | lens 9.3 |
| 65 ÷ 75 (convex) | −0.15 ÷ 0.2 | air | |
| −100 ÷ −110 (convex) | −10 ÷ −12 | $CaF_2$ | lens 9.4 |
| 80 ÷ 100 (convex) | −4 ÷ −7 | air | |
| 50 ÷ 55 (concave) | −5 ÷ −15 | fused silica | lens 9.5 |
| −35 ÷ −45 (concave) | −0.5 ÷ −2 | air | |
| −40 ÷ −45 (convex) | −20 ÷ −25 | $CaF_2$ | lens 9.6 |
| 70 ÷ 75 (convex) | −35 ÷ −45 | air | |
| 50 ÷ 65 (convex) | −17 ÷ −19 | fused silica | lens 9.7<br>$K = -15 \div -20$<br>$A_4 = -6 \div -10E-6$<br>$A_6 = 1.5 \div 2.5E-8$<br>$A_8 = -1 \div -1.6E-11$ |
| −25 ÷ −35 (concave) | −7 ÷ −10 | air | |

Where K denotes conicity and $A_i$ other aspheric coefficients.

12. The high resolution and high throughput Raman spectroscopy system for Raman spectroscopy in the deep ultraviolet spectral range of claim 7, wherein the high resolution and high throughput Raman spectroscopy system achieves a nominal lens speed of f/2 without a loss of throughput and without surface losses or vignetting.

13. The high resolution and high throughput Raman spectroscopy system for Raman spectroscopy in the deep ultraviolet spectral range of claim 7, wherein the lens closest to the multi-channel radiation detector has a surface closest to the multi-channel radiation detector that is concave and the final lens is made of CaF2 and has a surface farthest from the multi-channel radiation detector that is convex.

14. The high resolution and high throughput Raman spectroscopy system for Raman spectroscopy in the deep ultraviolet spectral range of claim 7, wherein the dispersing assembly comprises: a set of two prisms and a diffraction grating, wherein the incoming collimated beam falling on the set of two prisms has a smaller incidence angle than would the incoming collimated beam falling on a single prism, wherein the set of two prisms has smaller reflection loss of the dispersing assembly.

15. An optical system of high resolution display spectrograph for the detection of electromagnetic radiation spectrum in the ultraviolet region, intended for Raman spectroscopy in the deep ultraviolet region, comprising:
- an input aperture for input of a polychromatic beam of electromagnetic radiation, wherein the input aperture is a slit;
- a collimation unit for the collimation of the input polychromatic beam of electromagnetic radiation;
- a dispersion unit for at least one of refractive and diffractive dispersion of the polychromatic beam to monochromatic beams according to wavelength; and
- a focusing unit forming an image of the input aperture at an output aperture;
- wherein the collimation unit is a collimation lens consisting of a first and second aspherical mirror;
- wherein the first aspherical mirror has an inlet for the polychromatic beam of electromagnetic radiation;
- wherein the second aspherical mirror is placed so that a reflective surface of the second aspherical mirror faces the reflective surface of the first aspherical mirror;
- wherein the dispersion unit comprises at least one of a diffraction grating and a dispersion prism;
- wherein the dispersion unit is placed in the path of the input polychromatic beam of electromagnetic radiation after the polychromatic divergent beam of electromagnetic radiation has passed through the collimating unit, and wherein the prism increases dispersion and corrects beam expansion on the diffraction grating;
- wherein the focusing unit is a compound lens comprising a system of lenses, each lens made of one of CaF2 and fused silica;
- wherein at least one lens of the system of lenses has at least one aspherical optical surface, wherein the optical system is capable of performing high resolution and high throughput Raman spectroscopy in the deep ultraviolet spectral region of 205 to 270 nm;
- wherein the optical system is capable of lens speed of at least f/2;
- further wherein the optical system is capable of achieving spectral resolution of less than 12 $cm^1$.

\* \* \* \* \*

UNITED STATES PATENT AND TRADEMARK OFFICE
CERTIFICATE OF CORRECTION

PATENT NO. : 10,190,912 B2
APPLICATION NO. : 14/962100
DATED : January 29, 2019
INVENTOR(S) : Josef Kapitán It is certified that error appears in the above-identified patent and that said Letters Patent is hereby corrected as shown below:

In the Claims

Column 16, Line 8, in Claim 15, delete "at least one of"

Signed and Sealed this
Ninth Day of April, 2019

Andrei Iancu
*Director of the United States Patent and Trademark Office*